Patented Nov. 25, 1930

1,782,729

UNITED STATES PATENT OFFICE

FELIX KLINGEMANN, OF MAINKUR, NEAR FRANKFORT-ON-THE-MAIN, WILHELM LOMMEL, OF WIESDORF, NEAR COLOGNE-ON-THE-RHINE, ERNST KORTEN, OF FECHENHEIM, NEAR FRANKFORT-ON-THE-MAIN, AND THEODOR GOOST, OF LEVERKUSEN, NEAR COLOGNE-ON-THE-RHINE, GERMANY, ASSIGNORS TO I. G. FARBENINDUSTRIE AKTIENGESELLSCHAFT, A CORPORATION OF GERMANY

PROCESS OF CATALYTICALLY HYDROGENATING AROMATIC AMINO COMPOUNDS AND PRODUCTS PRODUCED THEREBY

No Drawing. Application filed October 2, 1926, Serial No. 139,226, and in Germany October 10, 1925.

The methods hitherto known for preparing hydrogenated aromatic amino compounds do not give satisfactory results. The hydrogenation of primary aromatic amines as described by Ipatiew (cf. Berichte d. Deutschen Chem. Ges. 41 (1908) page 991) with hydrogen and catalysts under pressure goes on very slowly and undesirable by-products are formed. Sabatier and Senderens have reduced secondary and tertiary amines in the presence of finely divided nickel in the gaseous state, but their results are far from being satisfactory as far as quantity and quality are concerned. (Compt. Rend. de l'Acad. de Science, vol. 138, page 457).

Now we have found that aromatic amino compounds of the general formula:

(in which formula R means an aryl residue of the benzene—or of the naphthalene series, $X_1$ means hydrogen, which may be replaced by alkyl, aralkyl and aryl, and $X_2$ means alkyl, which may be replaced by aralkyl, or acyl) and hydrogen quickly and smoothly when treated with hydrogen in a liquid phase in the presence of a hydrogenating catalyst under pressure. Nickel, cobalt, copper or mixtures of these metals or oxides thereof, advantageously precipitated on a substratum of large surface, hereinafter referred to simply by the term base metal hydrogenation catalysts, may be used as the hydrogenating catalysts. In the case of the alkyl-, aralkyl- or aryl derivatives the desired hydrogenated bases are obtained immediately, whilst in the case of acyl-derivatives the acyl group may be removed by saponification, the hydrogenated bases being thus formed.

The products obtained by the method described above are partially new and may be used for the preparation of pharmaceutical and other valuable technical products.

The following examples illustrate our process:

Example 1

100 parts of ethylaniline are heated in an autoclave provided with a stirring apparatus with 1 part of nickel oxide under a pressure of 100–150 hydrogen-atmospheres at a temperature of 280–310° C. In order to mix the substances well the mass is then stirred. After about 20 minutes about 85% hexahydroethylaniline of the formula

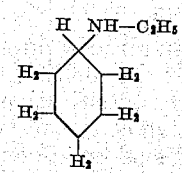

is formed. The process is then interrupted and the product is purified by distillation. It forms a colourless oil, which has the properties described in the literature.

Example 2

100 parts of dimethylaniline are reduced under the same conditions as described in Example 1. The hexahydrodimethylaniline of the formula

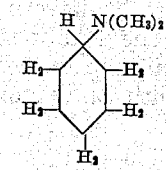

shows the properties described in the literature. The same result may be obtained if the dimethylaniline is hydrogenated at a lower temperature and pressure, but the reaction affords longer time.

In an analogous manner the homologues of the mono- and dialkylated anilines may be hydrogenated, such as ethyl-o-toluidine, diethyl-p-toluidine, the corresponding xylidine derivatives and also the alkylated and arylated naphthylamines, such as ethyl-α-naphthylamine, phenyl-β-naphthylamine or benzyl-α-naphthylamine. The hydrogenated products thus formed are partly new compounds; they are colourless bodies of a strongly basic character. Generally the products of the benzene series are hexahydrocompounds, those of the naphthalene series tetrahydrocompounds.

Example 3

50 parts of acetyl-α-naphthylamine are heated with 150 parts of tetraline and 1 part of kieselguhr catalyst containing about 25% nickel in an autoclave while stirring under a hydrogen pressure of about 15–30 atmospheres. The addition of hydrogen begins already at a temperature of a little above 110° C., but it is advisable to raise the temperature to 160–180° C. When two molecules of hydrogen have been added, the mass while still hot is filtered off from the catalyst. From the filtrate acetyl-ar-tetrahydro-α-naphthylamine of the probable formula

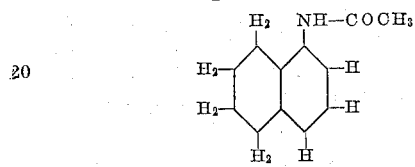

separates out in an already pure state in form of fine needles of the melting point 159° C. The yield is nearly quantitative.

By saponification of the acetyl product according to the usual methods the free ar-tetrahydro-α-naphthylamine is obtained in form of an oil, which does not solidify at ordinary temperatures and which boils at 275° C. under normal pressure.

Example 4

50 parts of pure acetyl-β-naphthylamine are heated in an autoclave while stirring with 200 parts of dekaline in the presence of a catalyst containing nickel under a hydrogen-pressure of about 20 atmospheres. When 2 molecules of hydrogen have been added the mass is filtered. The dekaline is distilled off with steam. From the residue the acetyl-ar-tetrahydro-β-naphthylamine of the probable formula

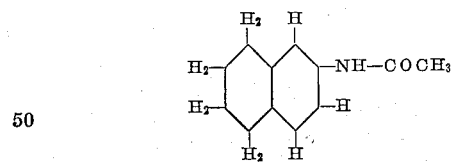

can be extracted with ether. After the ether is distilled off the product remains in the form of an oil which solidifies on cooling. The acetyl compound may be saponified by treatment with hydrochloric acid. The ar-tetrahydro-β-naphthylamine thus obtained has the boiling point 271–273° C. at normal pressure (Bamberger, Ber. d. Deutsch. Chem. Ges. 23, p. 882, gives boiling point 275–277° C.).

Example 5

35 parts of benzoyl-β-naphthylamine, 70 parts of dekaline and 1,7 part of a kieselguhr catalyst containing 15% nickel are heated in an autoclave while stirring under a hydrogen-pressure of 15–30 atmospheres to about 170° C. Two molecules of hydrogen are absorbed very quickly under these conditions. When this point is reached, the operation is interrupted. The benzoyl-ar-tetrahydro-β-naphthylamine of the probable formula

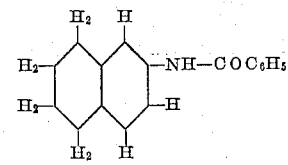

thus obtained, which has the melting point 165–167° C., yields on saponification the base already described in Example 4.

Example 6

If instead of the acetyl compound used in Example 3 formyl-α-naphthylamine is reduced under similar conditions, the product obtained yields after saponification the same ar-tetrahydro-α-naphthylamine described in Example 3.

In the same way tetrahydro-β-naphthylamine may be obtained from formyl-β-naphthylamine.

Also phthalic-α-naphthalide can readily be reduced according to the same process. The reduction product yields after saponification the same ar-tetrahydro-α-naphthylamine as described in Example 3.

Example 7

20 parts of 2-acetylamino-naphthalene-3-carboxylic ethylester, melting at 123° C., are hydrogenated under a hydrogen-pressure of 15–30 atmospheres while stirring in the presence of 100 parts of dekaline and 0,4 part of a kieselguhr catalyst containing about 15% nickel. Two molecules of hydrogen are quickly absorbed at a temperature of 120° C. By saponifying the hydrated ester under the usual conditions, the free 2-amino-3, ar-tetrahydronaphthoic acid of the probable formula

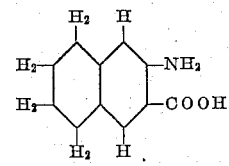

is obtained. This compound is readily soluble both in alkalies and in acids. It can be recrystallized from organic solvents of a low boiling point. From 50% acetic acid it separates for instance in colorless fine needles, melting at 180–182° C.

Also other bases as for instance acetylphenyl-α-naphthylamine or 1-acetylamino-2- naphtholethylether absorb hydrogen under corresponding conditions at about 130-180° C. rapidly and yield after saponification bases, which are hydogenated in the nucleus which is not substituted by the aminogroup.

We claim:

1. A new process of catalytically reducing aromatic aminocompounds comprising treating aromatic amino compounds of the general formula:

(wherein R means an aryl residue, $X_1$ means hydrogen, which may be replaced by alkyl, aralkyl and aryl, $X_2$ means alkyl, which may be replaced by aralkyl, or acyl) with hydrogen under pressure in a liquid phase in the presence of a base metal hydrogenation catalyst.

2. A new process of catalytically reducing aromatic aminocompounds of the benzene series comprising treating aromatic aminocompounds of the general formula:

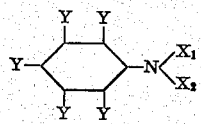

wherein $X_1$ stands for hydrogen or an alkyl, aralkyl, or aryl group, $X_2$ for an alkyl, aralkyl, or acyl group, and the Y's represent hydrogen atoms, which may be replaced by a monovalent substituent, with hydrogen under pressure in a liquid phase in the presence of a base metal hydrogenation catalyst.

3. A new process of catalytically reducing aromatic aminocompounds of the benzene series comprising treating aromatic aminocompounds of the general formula:

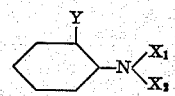

wherein $X_1$ stands for hydrogen or an alkyl, aryl, or aralkyl group, $X_2$ for an alkyl, aralkyl, or acyl group, and Y represents a monovalent substituent, with hydrogen under pressure in a liquid phase in the presence of a base metal hydrogenation catalyst.

4. As new products hydrogenated aminocompounds of the benzene series of the general formula:

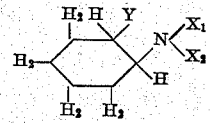

wherein $X_1$ stands for hydrogen or an alkyl, aryl, or aralkyl group, $X_2$ for an alkyl, aralkyl, or acyl group, and Y represents a methyl group, which products are colorless oils of a strong basic character which absorb carbonic acid from the air.

5. As a new product hexahydroethyl-ortho-toluidin of the formula:

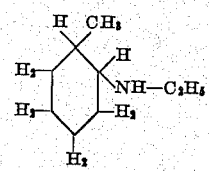

which is a colorless oil and which absorbs carbonic acid from the air.

In testimony whereof, we affix our signatures.

FELIX KLINGEMANN.
WILHELM LOMMEL.
ERNST KORTEN.
THEODOR GOOST.